United States Patent [19]
Uno

[11] Patent Number: 6,052,535
[45] Date of Patent: Apr. 18, 2000

[54] COLLAPSIBLE LENS BARREL WITH FLEXIBLE SUBSTRATE

[75] Inventor: Tetsuya Uno, Sakai, Japan

[73] Assignee: Minolta Co., Ltd., Osaka, Japan

[21] Appl. No.: 09/227,409

[22] Filed: Jan. 8, 1999

Related U.S. Application Data

[63] Continuation of application No. 08/792,190, Jan. 30, 1997, Pat. No. 5,892,988.

[30] Foreign Application Priority Data

Jan. 31, 1996 [JP] Japan .................................. 8-15985

[51] Int. Cl.⁷ .................................................. G03B 17/00
[52] U.S. Cl. .............................. 396/72; 396/542; 359/704; 359/826
[58] Field of Search .................................. 396/72, 77, 78, 396/79, 85, 86, 87, 542; 359/704, 823, 824, 825, 826

[56] References Cited

U.S. PATENT DOCUMENTS

| | | | |
|---|---|---|---|
| 5,079,577 | 1/1992 | Nomura | 396/72 |
| 5,198,932 | 3/1993 | Takamura | 359/694 |
| 5,581,412 | 12/1996 | Tanaka | 359/697 |
| 5,652,922 | 7/1997 | Kohno | 396/72 |
| 5,659,810 | 8/1997 | Nomura et al. | 396/72 |

FOREIGN PATENT DOCUMENTS

| | | |
|---|---|---|
| 5-134159 | 5/1993 | Japan . |
| 7-027963 | 1/1995 | Japan . |
| 7-128567 | 5/1995 | Japan . |
| 2 281 407 | 3/1995 | United Kingdom . |

*Primary Examiner*—Howard B. Blankenship
*Attorney, Agent, or Firm*—Burns, Doane, Swecker & Mathis, LLP

[57] ABSTRACT

Because the keys located on the first rotating barrel have essentially the same inner diameter as the second rotating barrel, no unnecessary space is formed inside the first rotating barrel and the second rotating barrel. In addition, although the inner diameter of the keys of the first rotating barrel and the inner diameter of the second rotating barrel are essentially the same, because the keys engage with the straight advancement grooves on the second rotating barrel, the first rotating barrel and the second rotating barrel do not interfere with each other. Moreover, because the keys that are thinner than the second rotating barrel overlap with the second rotating barrel, said keys being inside the second rotating barrel, the thickness of the keys does not affect the outer diameter of the lens barrel at all. Therefore, it is only the first straight advancing barrel that is located outside the second rotating barrel to move out the second rotating barrel and that adds to the outer diameter of the lens barrel. Also, a flexible substrate is accommodated in an optical path space when the lens barrel is collapsed.

11 Claims, 18 Drawing Sheets

COLLAPSIBLE LENS BARREL WITH FLEXIBLE SUBSTRATE

This application is a continuation of application Ser. No. 08/792,190, filed Jan. 30, 1997, now U.S. Pat. No. 5,892,988.

BACKGROUND OF THE INVENTION

1. Field of the Invention

The present invention relates to a lens barrel, i.e., a thin lens barrel for use in a camera, and more particularly, to a lens barrel incorporated in a so-called lens shutter camera.

2. Description of the Related Art

Generally, a zoom lens barrel includes a stationary barrel fixed to the camera body, and one or more than movable barrels fitted inside the stationary barrel. It is necessary to increase the lens barrel moving-out amount in order to meet a demand of higher zoom ratio of the zoom lens. However, if the moving-out amount is increased by increasing the length of each movable barrels being included in the lens barrel, the length of the stationary barrel in which all the movable barrels are housed also increases. If the length of the stationary barrel increases, the length of the lens barrel that is collapsed into the camera body increases, causing the camera body to become thicker. If the moving-out amount is increased by increasing the number of movable barrels, the outer diameter of the lens barrel increases, which results in an increase in the size of the camera body. In order to resolve these problems and to achieve a higher zoom ratio zoom lens and compact camera body, various multi-step moving-out zoom lens barrels, having at least three barrels including a plurality of movable barrels which are fitted inside a stationary barrel, have been conventionally proposed, for example, in Japanese Laid-Open Patent Application Hei 7-27963.

The construction of a conventional lens barrel is explained below using a three-step moving-out lens barrel which has three movable barrels proposed in Japanese Laid-Open Patent Application Hei 7-27963. FIG. 19 is a vertical cross-sectional view outlining the construction of a lens barrel proposed in Japanese Laid-Open Patent Application Hei 7-27963. Fixed barrel 101 is mounted inside and is fixed to camera body B, and lead guide 101a is formed on the inner surface of stationary barrel 101. First rotating barrel 102 is located inside stationary barrel 101, and lead follower 102a and gear 102b are formed on the outer surface of first rotating barrel 102. Because lead follower 102a is engaged with lead guide 101a, when the rotational drive force from the drive source (not shown in the drawing) inside camera body B is transmitted to gear 102b, first rotating barrel 102 moves along optical axis AX while rotating.

First straight advancing barrel 103 is located inside first rotating barrel 102. Claws 103b are formed on the outer surface of first straight advancing barrel 103, and claws 103b are engaged with claws 102d formed on the inner surface of first rotating barrel 102 in a bayonet-connection. Pins 103c are also formed on the outer surface of first straight advancing barrel 103 and are engaged with straight advancement grooves 101b formed on the inner surface of stationary barrel 101. Therefore, when first rotating barrel 102 moves along optical axis AX while rotating, first straight advancing barrel 103 moves straight ahead along optical axis AX together with first rotating barrel 102, while being prevented from rotating by means of straight advancement grooves 101b.

Second rotating barrel 104 is located inside first straight advancing barrel 103. Cam followers 104a are located on the outer surface of second rotating barrel 104, and cam followers 104a are engaged with straight advancement grooves 102c of first rotating barrel 102 via cam holes 103d formed on first straight advancing barrel 103. Therefore, when first rotating barrel 102 rotates, its rotational force is transmitted to second rotating barrel 104 by means of cam followers 104a. Second rotating barrel 104 then moves along optical axis AX, regulated by straight advancement grooves 102c, while rotating along cam holes 103d.

Second straight advancing barrel 105 is located inside second rotating barrel 104. Claws 105b are formed on the outer surface of second straight advancing barrel 105, and claws 105b are engaged with claws 104b formed on the inner surface of second rotating barrel 104 in a bayonet-connection. Pins 105a are also formed on the outer surface of second straight advancing barrel 105, and are engaged with straight advancement grooves 103a formed on the inner surface of first straight advancing barrel 103. Therefore, when second rotating barrel 104 moves along optical axis AX while rotating, second straight advancing barrel 105 moves straight ahead along optical axis AX together with second rotating barrel 104, while being prevented from rotating by means of straight advancement grooves 103a.

Third straight advancing barrel 106 is located inside second rotating barrel 104. First block 107 is fixed and supported inside third straight advancing barrel 106. First block 107 comprises a focus unit, shutter unit, first lens unit and first lens holder to support the first lens unit, which are not shown in the drawing.

Cam followers 106a are located on the outer surface of third straight advancing barrel 106, and cam followers 106a are engaged with cam grooves 104c formed on the inner surface of second rotating barrel 104. Pins 105d are formed on the outer surface of second straight advancing barrel 105, and pins 105d are engaged with straight advancement grooves 106b formed on the inner surface of third straight advancing barrel 106. Therefore, when second rotating barrel 104 moves along optical axis AX while rotating, third straight advancing barrel 106 moves straight ahead along optical axis AX due to the movement of cam followers 106a along cam grooves 104c, while being prevented from rotating by means of straight advancement grooves 106b. When third straight advancing barrel 106 moves, second straight advancing barrel 105 enters gap 107a between third straight advancing barrel 106 and first block 107, but does not interfere with third straight advancing barrel 106 or first block 107.

Second block 108 is also located inside second straight advancing barrel 105. Second block 108 comprises a second lens unit and a second lens holder to support the second lens unit, which are not shown in the drawing. Cam followers 108a are located on the outer surface of the second lens holder, and are engaged with cam grooves 104d formed on the inner surface of second rotating barrel 104 via straight advancement grooves 105c formed on second straight advancing barrel 105. Therefore, when second rotating barrel 104 moves along optical axis AX while rotating, second block 108 moves straight ahead along optical axis AX due to the movement of cam followers 108a along cam grooves 104d, while being prevented from rotating by means of straight advancement grooves 105c.

Flexible substrate F, which electrically connects the focus unit and shutter unit comprising first block 107 and camera body B, is located inside the lens barrel. Flexible substrate F is guided by being attached to first through third straight advancing barrels 103, 105 and 106 such that it does not come near first and second rotating barrels 102 and 104. Because of this, it is not affected by the rotation of first and second rotating barrels 102 and 104. When the lens barrel moves from the telephoto condition to the wide angle condition and to the completely collapsed condition, flexible substrate F becomes loose. However, because the excess length of flexible substrate F is housed inside flexible substrate housing box 109 located on the outer surface of stationary barrel 101, the outer diameter of the lens barrel may be made smaller than when flexible substrate F is housed in the gaps between the barrels.

In the three-step moving-out lens barrel proposed in Japanese Laid Open Patent Application Hei 7-27963 described above, the movable barrels that are moved out in the first step comprise two barrels, i.e., first rotating barrel 102 and first straight advancing barrel 103, the movable barrels that are moved out in the second step comprise two barrels, i.e., second rotating barrel 104 and second straight advancing barrel 105, and the movable barrels that are moved out in the third step comprise one barrel, i.e., third straight advancing barrel 106. While the moving-out in the third step is achieved by means of second rotating barrel 104, which is located around third straight advancing barrel 106, and second straight advancing barrel 105, which is located inside third straight advancing barrel 106, the moving-out in the second step is achieved by means of two barrels, i.e., first straight advancing barrel 103 and first rotating barrel 102, which are located around second rotating barrel 104.

In order to have second straight advancing barrel 105 located inside third straight advancing barrel 106 as described above, gap 107a between first block 107 and third straight advancing barrel 106 is formed for second straight advancing barrel 105 to enter. This is realized by making the outer diameter of first block 107 small, by which the outer diameter of the part of the lens barrel that is used for the third step moving-out may be made small. Similarly, if first straight advancing barrel 103 that is used for the second step moving-out is located inside second rotating barrel 104, the diameter of the part of the lens barrel that is used for the second-step moving-out may be made smaller. However, it is difficult to obtain space to allow first straight advancing barrel 103 to be inside second rotating barrel 104 without first straight advancing barrel 103 interfering with second straight advancing barrel 105.

Japanese Laid-Open Patent Application Hei 7-128567 also proposes a three-step moving-out lens barrel that has a particular rotation transmission mechanism in order to allow high zoom ratio of the zoom lens and a compact camera body. However, in this lens barrel, the rotation transmission mechanism comprising a number of gears, pinions, etc. requires that a large space exist around the optical system in the completely collapsed condition. Consequently, the outer diameter of the lens barrel inevitably becomes large.

SUMMARY OF THE INVENTION

The present invention was made in view of the problems described above. Its object is to provide a thin lens barrel that has a small outer diameter and that can perform multi-step moving-out.

Another object of the present invention is to provide a thin lens barrel that can perform multi-step moving-out without adding more gears, pinions, etc., as components of the rotation transmission mechanism.

In order to attain the objects described above, the lens barrel of the present invention comprises a straight advancing moving-out barrel that moves straight ahead along the optical axis; a rotating moving-out member that is located inside said straight advancing moving-out barrel and that moves along the optical axis together with said straight advancing moving-out barrel; and a rotatable moving-out barrel that is located inside said straight advancing moving-out barrel and that is moved out by said straight advancing moving-out barrel and said rotating moving-out member, wherein said rotatable moving-out barrel has a space in which said rotating moving-out member enters with overlapping in a diameter direction of the lens barrel.

Using the construction described above, the rotating moving-out member enters the space formed on the rotatable moving-out barrel, and therefore the rotating moving-out member and the rotatable moving-out barrel do not interfere with each other. Moreover, because the rotating moving-out member and the rotatable moving-out barrel overlap one inside the other, the thickness of the part that enters said space has no effect whatsoever on the outer diameter of the lens barrel. Therefore, it is only the straight advancing moving-out barrel that is located outside the rotatable moving-out barrel to move out the rotatable moving-out barrel and that adds to the outer diameter of the lens barrel.

The camera having a lens barrel of the present invention comprises a stationary barrel that is mounted inside and is fixed to said camera body; a first rotating barrel that is located inside said stationary barrel and that moves along the optical axis while rotating; a first straight advancing barrel that is located between said first rotating barrel and said stationary barrel and that moves straight ahead along the optical axis together with said first rotating barrel; a second rotating barrel that is located inside said first straight advancing barrel and that moves along the optical axis while rotating together with said first rotating barrel; a second straight advancing barrel that is located inside said second rotating barrel and that moves straight ahead along the optical axis together with said second rotating barrel; a third straight advancing barrel that moves straight ahead along the optical axis by said second straight advancing barrel and said second rotating barrel, an engagement member which is formed on said first rotating barrel and has essentially the same inner diameter as said second rotating barrel; and a groove which is located on inside said second rotating barrel with which said engagement member engages.

Using the construction described above, because the engagement member engages with the groove on the second rotating barrel, the first rotating barrel and the second rotating barrel do not interfere with each other. Moreover, because the engagement member that is thinner than the second rotating barrel overlaps with the second rotating barrel, said engagement member being inside the second rotating barrel, the thickness of the engagement member does not affect the outer diameter of the lens barrel at all. Therefore, it is only the first straight advancing barrel that is located outside the second rotating barrel to move out the second rotating barrel and that adds to the outer diameter of the lens barrel.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1:
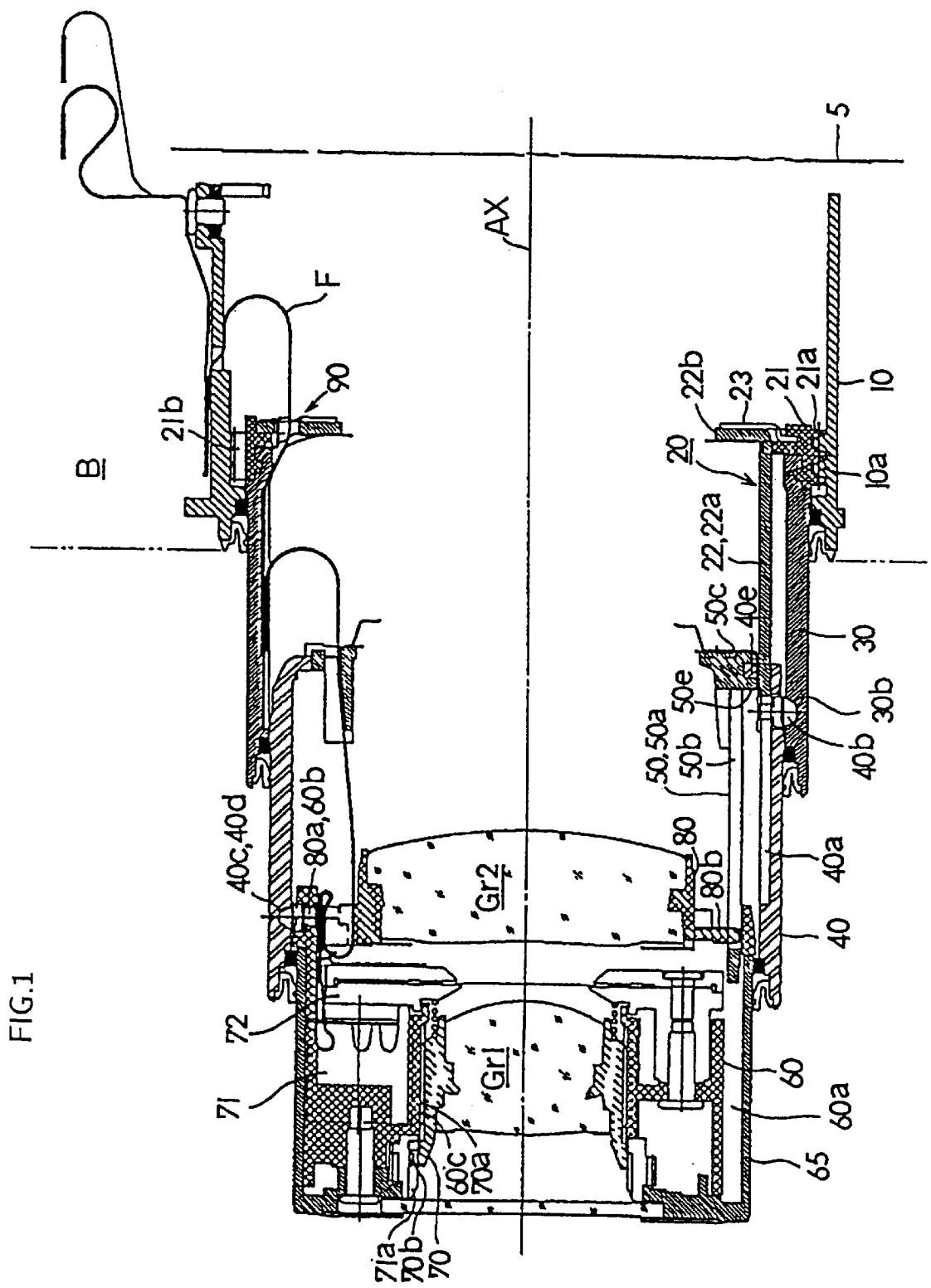
FIG. 1 is a vertical cross-sectional view of a lens barrel in the telephoto condition according to one embodiment of the present invention.
Figure 2:
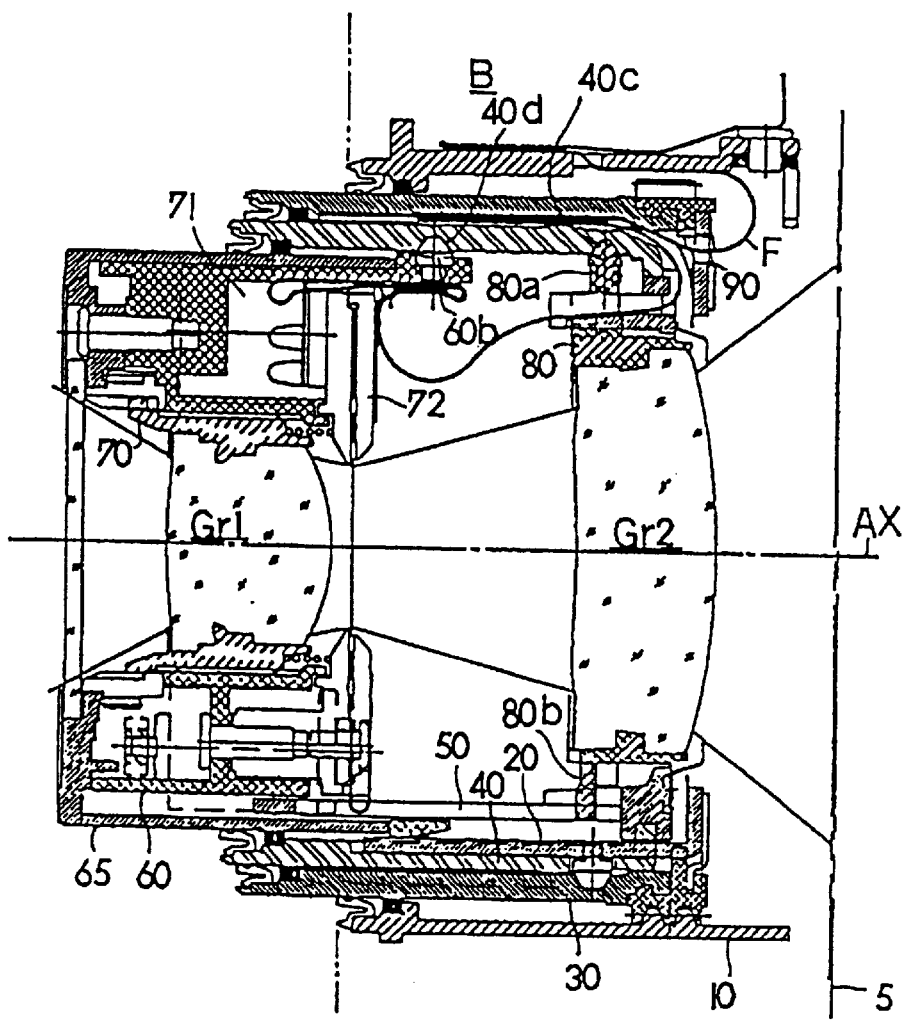
FIG. 2 is a vertical cross-sectional view of the lens barrel in the wide angle condition according to the embodiment.
Figure 3:
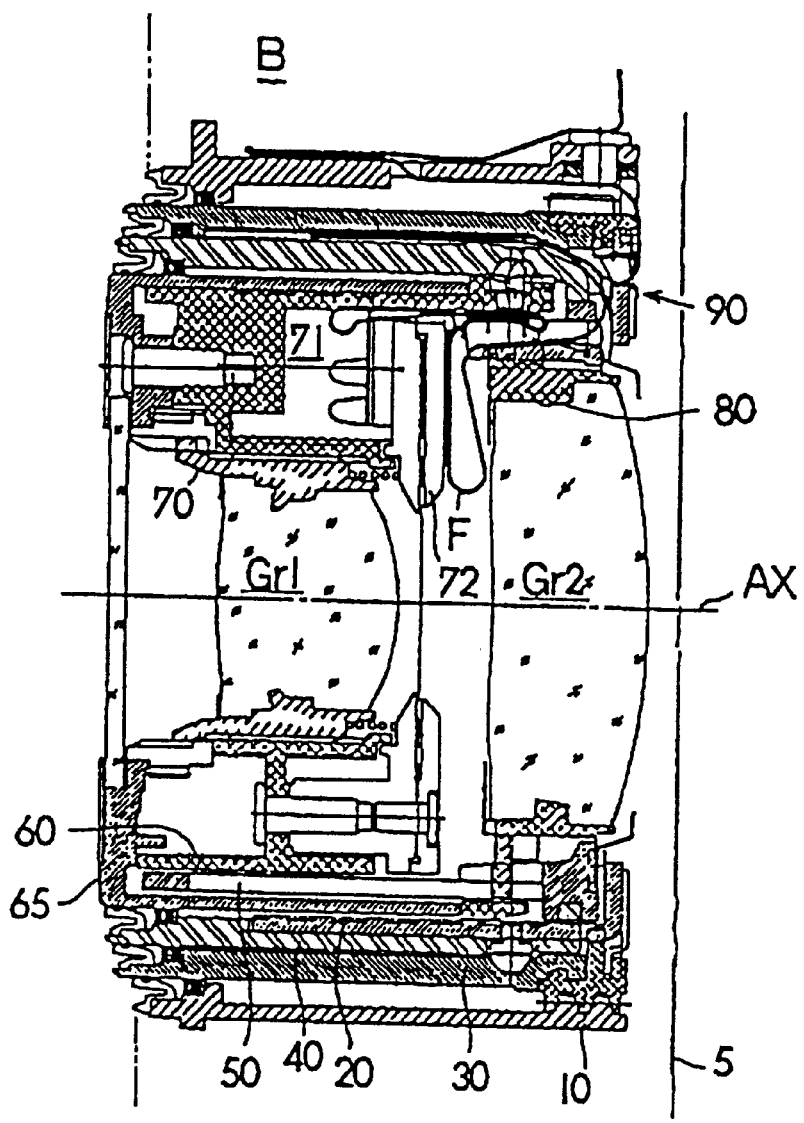
FIG. 3 is a vertical cross-sectional view of the lens barrel in the completely collapsed condition according to the embodiment.
Figure 4:
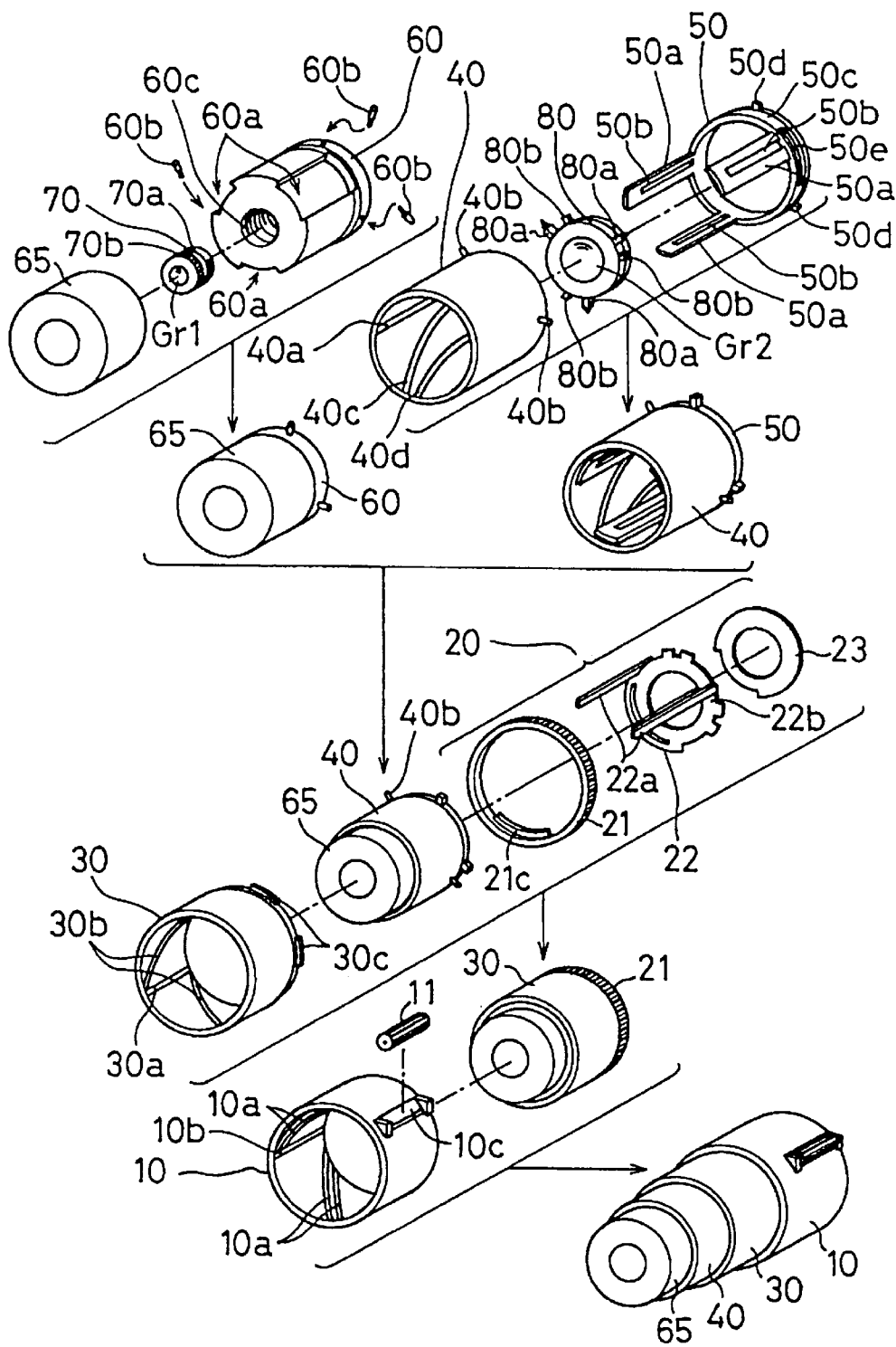
FIG. 4 is a simplified perspective view showing the external views of components which is included in the lens barrel shown in FIGS. 1 through 3 in a disassembled condition.
Figure 5:
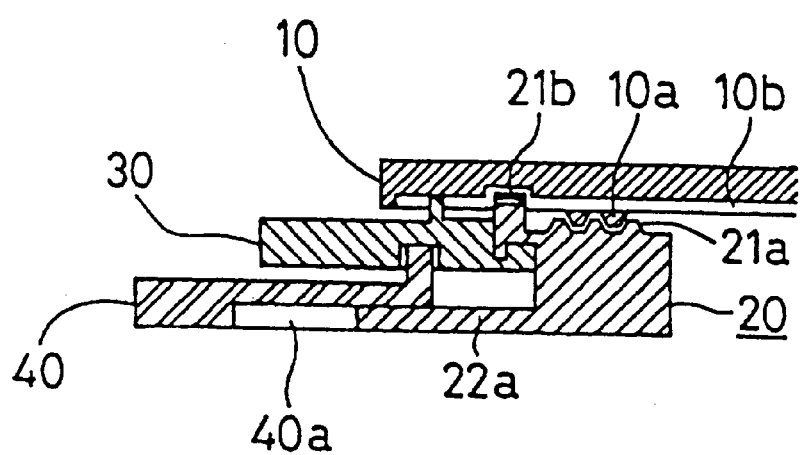
FIG. 5 is a simplified vertical cross-sectional view showing the construction of the important area of the lens barrel shown in FIGS. 1 through 3.

The lens barrel according to one embodiment of the present invention is explained below with reference to the drawings. FIGS. 1 through 3 are vertical cross-sectional views showing the zoom lens barrel according to said embodiment. FIG. 1 shows it in the telephoto condition. FIG. 2 shows it in the wide angle condition. FIG. 3 shows it in the completely collapsed condition. FIG. 4 is a perspective view showing the lens barrel shown in FIGS. 1 through 3 in a disassembled condition, and FIG. 5 is a simplified vertical cross-sectional view showing the important area of the lens barrel. This lens barrel is a three-step moving-out lens barrel used in a lens shutter camera, and primarily comprises stationary barrel 10, first rotating barrel 20, first straight advancing barrel 30, second rotating barrel 40, second straight advancing barrel 50 and third straight advancing barrel 60.

Fixed barrel 10 is mounted and fixed inside camera body B, and opening 10c and female helicoids 10a are formed on its surface, as shown in FIG. 4. First rotating barrel 20 is located inside stationary barrel 10, as shown in FIG. 1, etc. First rotating barrel 20 comprises, as shown in FIG. 4, cylindrical drive force transmission member 21, metal rotating moving-out member 22 consisting of keys 22a and flange 22b, and ring-shaped fixed member 23, such that the three members 21 through 23 are united, while fixed member 23 and drive force transmission member 21 sandwich flange 22b.

Male helicoids 21a and gear 21b are formed on the outer surface of drive force transmission member 21. Male helicoids 21a are engaged with female helicoids 10a of stationary barrel 10, and gear 21b is engaged with gear 11 (FIG. 4) via opening 10c of stationary barrel 10. Therefore, when the rotational drive force (the drive source, such as a motor, is not shown in the drawings) from camera body B is transmitted to gear 21b via gear 11, first rotating barrel 20 moves along optical axis AX while rotating by means of the helicoid mechanism comprising male helicoids 21a and female helicoids 10a.

First straight advancing barrel 30 is a straight advancing moving-out barrel that is located between (i) stationary barrel 10 and (ii) drive force transmission member 21 and keys 22a being included in a part of first rotating barrel 20. Claws 30c are formed on the outer surface of first straight advancing barrel 30 (FIG. 4). These claws 30c are bayonet-connected with claws 21c formed on the inner surface of drive force transmission member 21 (FIG. 4). Pins (not shown in the drawing) are also formed on the outer surface of first straight advancing barrel 30 and are engaged with straight advancement grooves 10b that are formed on the inner surface of stationary barrel 10. Therefore, when first rotating barrel 20 moves along optical axis AX while rotating, first straight advancing barrel 30 moves straight ahead along optical axis AX together with first rotating barrel 20, while being prevented from rotating by means of straight advancement grooves 10b.

Second rotating barrel 40 is located inside first straight advancing barrel 30, and is a rotatable moving-out barrel that is moved out by means of first rotating barrel 20 and first straight advancing barrel 30. Second rotating barrel 40 has essentially the same inner diameter as keys 22a of rotating moving-out member 22 (to be accurate, the inner diameter of keys 22a is slightly smaller than the inner diameter of second rotating barrel 40). Keys 22a are thinner than second rotating barrel 40. Straight advancing grooves 40a are formed on the inner surface of second rotating barrel 40 such that keys 22a may enter them along optical axis AX. Three sets of cam grooves 40c and 40d, which are described below, are formed on the inner surface of second rotating barrel 40, and there are enough spaces between these sets to form straight advancement grooves 40a. Therefore, it is possible to form straight advancement grooves 40a having the same depth as cam grooves 40c and 40d on the inner surface of second rotating barrel 40.

Cam followers 40*b* are located on the outer surface of second rotating barrel 40. Cam followers 40*b* are engaged with cam grooves 30*b* formed on the inner surface of first straight advancing barrel 30. Therefore, when first rotating barrel 20 moves along optical axis AX while rotating, second rotating barrel 40 moves along optical axis AX via the movement of cam followers 40*b* along cam grooves 30*b* while rotating together with first rotating barrel 20 based on the rotational drive force from first rotating barrel 20 due to the engagement of keys 22*a* with straight advancement grooves 40*a* along optical axis AX described above.

As described above, because the inner diameter of second rotating barrel 40 and the inner diameter of keys 22*a* composing a part of first rotating barrel 20 are essentially the same, no wasteful space is created inside keys 22*a* or second rotating barrel 40. Therefore, when the lens barrel is collapsed to the wide angle condition or to the completely collapsed position, third straight advancing barrel 60, etc. may enter inside second rotating barrel 40, as shown in FIGS. 1 through 3.

In addition, although the inner diameter of keys 22*a* and the inner diameter of second rotating barrel 40 are essentially the same, since keys 22*a* enter straight advancement grooves 40*a* of second rotating barrel 40, rotating moving-out member 22 and second rotating barrel 40 do not interfere with each other. Moreover, as shown in FIG. 5, etc., because keys 22*a* that are thinner than second rotating barrel 40 and second rotating barrel 40 overlap, said keys 22*a* being inside second rotating barrel 40, the thickness of keys 22*a* does not affect the outer diameter of the lens barrel. Therefore, it is only first straight advancing barrel 30 that is located outside second rotating barrel 40 to move out second rotating barrel 40 and that adds to the outer diameter of the lens barrel. Consequently, the outer diameter of the lens barrel may be made smaller to the extent that rotating moving-out member 22 does not affect the outer diameter of the lens barrel.

Second straight advancing barrel 50 is located inside second rotating barrel 40. Second straight advancing barrel 50 comprises, as shown in FIG. 4, ring 50*c* and keys 50*a* that extend from ring 50*c* along optical axis AX. Pins 50*d* and claws 50*e* are located on the outer surface of ring 50*c*, and straight advancement grooves 50*b* that extend along optical axis AX are formed on keys 50*a*.

Claws 50*e* are bayonet-connected with claws 40*e* formed on the inner surface of second rotating barrel 40 (FIG. 1, etc.). Pins 50*d* formed on the outer surface of ring 50*c* are engaged with straight advancement grooves 30*a* formed on the inner surface of first straight advancing barrel 30 (FIG. 4). Therefore, when second rotating barrel 40 moves along optical axis AX while rotating, second straight advancing barrel 50 moves straight ahead along optical axis AX together with second rotating barrel 40, while being prevented from rotating by means of straight advancement grooves 30*a*.

Second lens holder 80 is located inside keys 50*a*. Second lens unit Gr2 is mounted and fixed inside second lens holder 80, and cam followers 80*a* and pins 80*b* are located on the outer surface of second lens holder 80. Cam followers 80*a* are engaged with cam grooves 40*c* formed on the inner surface of second rotating barrel 40, and pins 80*b* are engaged with straight advancement grooves 50*b* formed on keys 50*a*. Therefore, when second rotating barrel 40 moves along optical axis AX while rotating, second lens holder 80 moves straight ahead along optical axis AX via the movement of cam followers 80*a* along cam grooves 40*c*, while being prevented from rotating by means of straight advancement grooves 50*b*.

Third straight advancing barrel 60 and a barrel 65 for improving appearance are located inside second rotating barrel 40. The barrel 65 is mounted outside third straight advancing barrel 60, being fixed to said barrel 60. Focus unit 71 is mounted and fixed inside the front area of third straight advancing barrel 60, and shutter unit 72 is mounted and fixed inside the rear area of third straight advancing barrel 60.

Straight advancement grooves 60*a* are formed on the outer surface of third straight advancing barrel 60, and cam followers 60*b* are located in the back of straight advancement grooves 60*a*. Cam followers 60*b* are engaged with cam grooves 40*d* formed on the inner surface of second rotating barrel 40, and keys 50*a* are engaged with straight advancement grooves 60*a* along optical axis AX. Therefore, when second rotating barrel 40 moves along optical axis AX while rotating, third straight advancing barrel 60 moves straight ahead along optical axis AX via the movement of cam followers 60*b* along cam grooves 40*d*, while being prevented from rotating by means of keys 50*a*.

Focus unit 71 has a AF (autofocus) motor inside. Since this AF motor is relatively large in focus unit 71, there is some usable space along the outer surface of ring-shaped focus unit 71. In addition, in contrast with focus unit 71, there is some usable space outside the shutter unit 72 in a diameter direction inside the focus unit 71. Straight advancement grooves 60*a* are formed on the outer surface of third straight advancing barrel 60 to take advantage of these usable areas.

Because keys 50*a* of second straight advancing barrel 50 overlap with third straight advancing barrel 60, said keys 50*a* being inside third straight advancing barrel 60, due to the engagement between keys 50*a* and straight advancement grooves 60*a*, the thickness of keys 50*a* that are in straight advancement grooves 60*a* has no effect whatsoever on the outer diameter of the lens barrel. Therefore, it is only second rotating barrel 40 that is located outside third straight advancing barrel 60 to move out third straight advancing barrel 60 and that adds to the outer diameter of the lens barrel. Thus, the outer diameter of the lens barrel may be made smaller to the extent that second straight advancing barrel 50 does not affect the outer diameter of the lens barrel.

First lens holder 70 is located further inside third straight advancing barrel 60. First lens unit Gr1 is mounted and fixed inside first lens holder 70. Male helicoids 70*a* and gear 70*b* are formed on the outer surface of first lens holder 70. Male helicoids 70*a* are engaged with female helicoids 60*c* formed on the inner surface of third straight advancing barrel 60, and gear 70*b* is engaged with gear 71*a* located on focus unit 71.

During focusing, the rotational drive force from focus unit 71 is transmitted to first lens holder 70 via the engagement of gear 71*a* and gear 70*b*. First lens holder 70 then moves along optical axis AX while rotating by means of the helicoid mechanism comprising female helicoids 60*c* of third straight advancing barrel 60 and male helicoids 70*a* of first lens holder 70.

Third straight advancing barrel 60 comprises a part to which cam followers 60*b* are mounted, a part to which shutter unit 72 is mounted and female helicoids 60*c*, all of which are unified as a single unit. Due to this unification, the precision in the mounting of cam followers 60*b*, shutter unit 72 and first lens holder 70 to third straight advancing barrel 60 is better than when third straight advancing barrel 60 is made of two components, and the cost of third straight advancing barrel 60 may be reduced as well. Due to the unification extending from cam followers 60b to female helicoids 60c, in particular, the occurrence of tilting, decentering, rattling, etc., of first lens unit Gr1 may be effectively prevented.

Laying of Flexible Substrate F (FIGS. 1 Through 3, 6 Through 10)

Figure 6A:
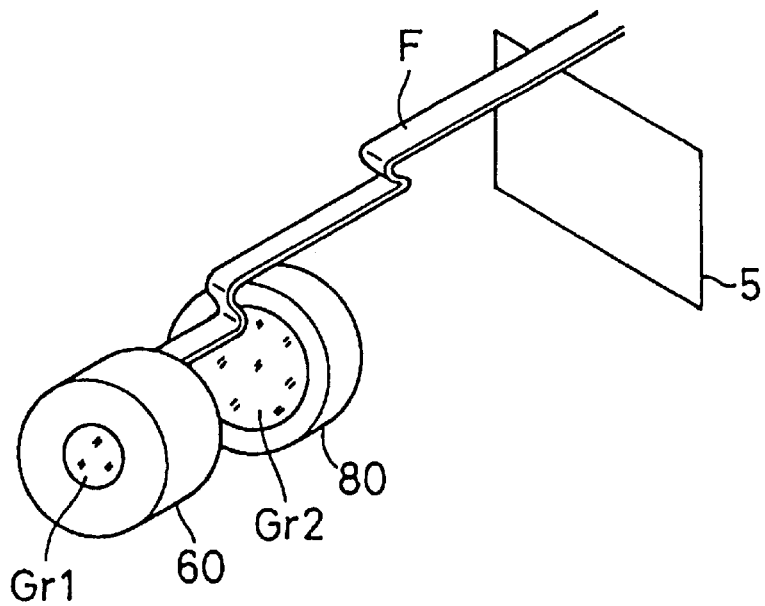
FIGS. 6(A), 6(B) and 6(C) are simplified perspective views showing the process by which the flexible substrate is housed inside the lens barrel.
Figure 6B:
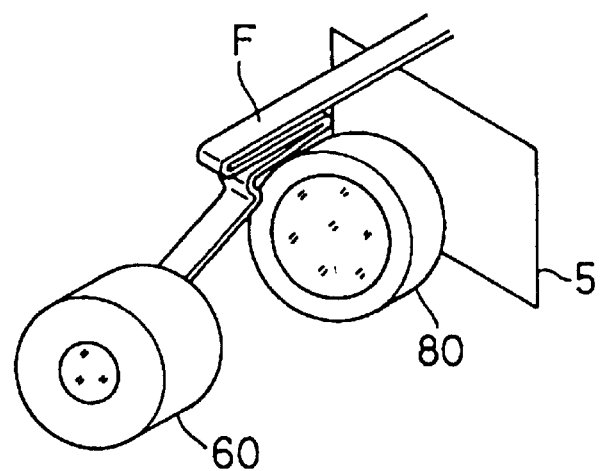
Figure 6C:
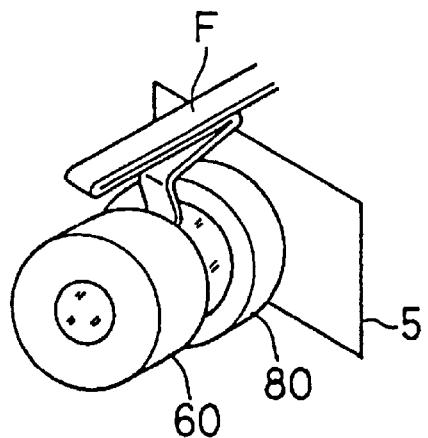
Figure 7A:
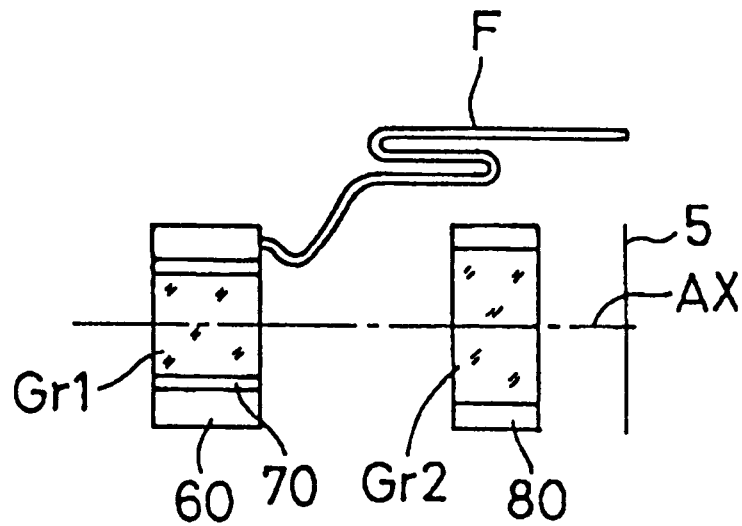
FIGS. 7(A) and 7(B) are simplified vertical cross-sectional views showing the process by which the flexible substrate is housed inside the lens barrel.
Figure 7B:
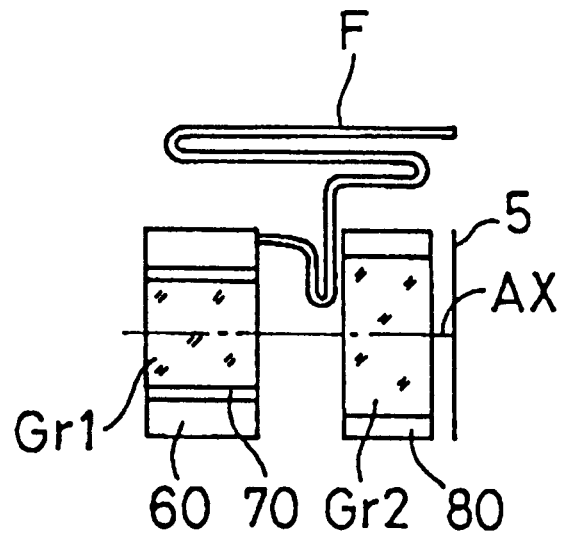
Figure 8:
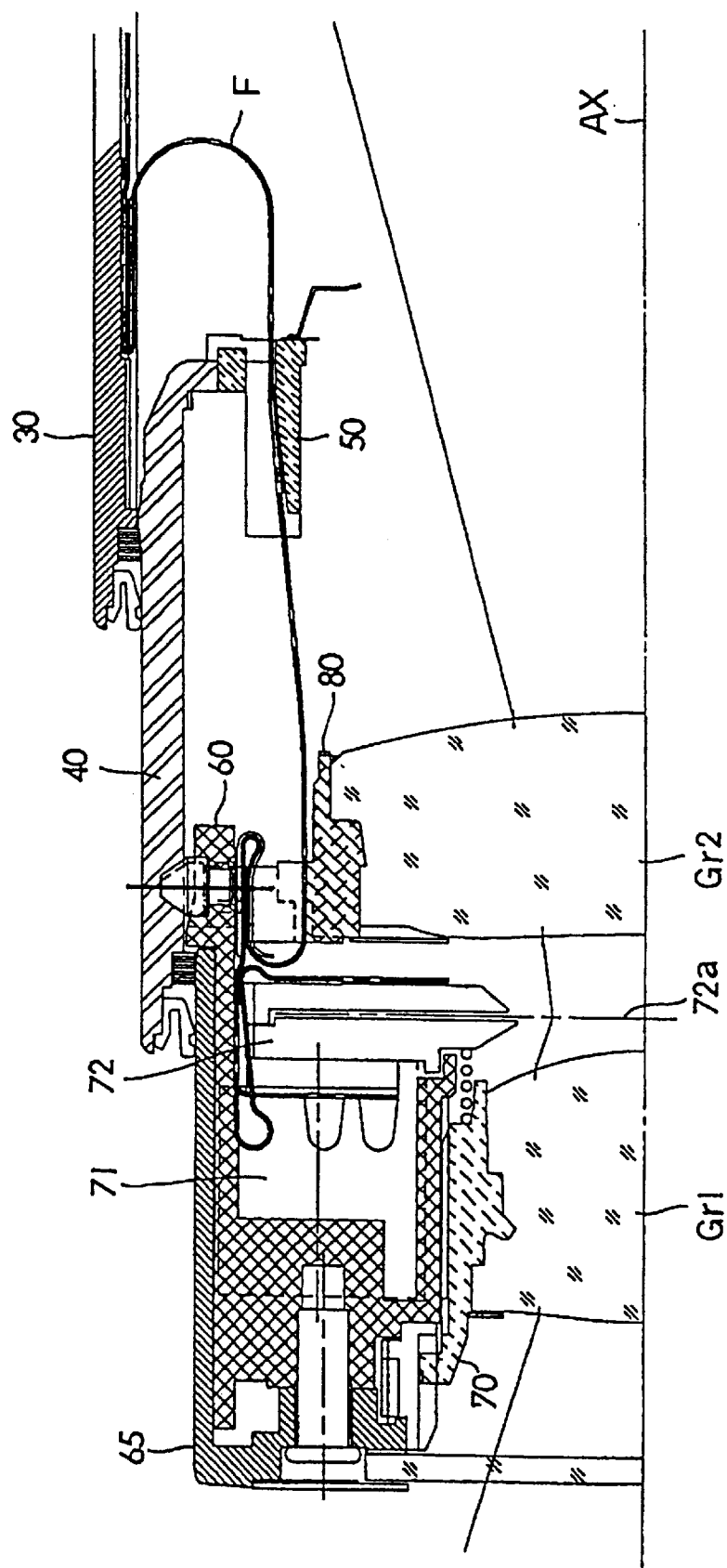
FIG. 8 is a detailed vertical cross-sectional view showing the manner in which the flexible substrate is housed in the condition shown in FIG. 1.
Figure 9:
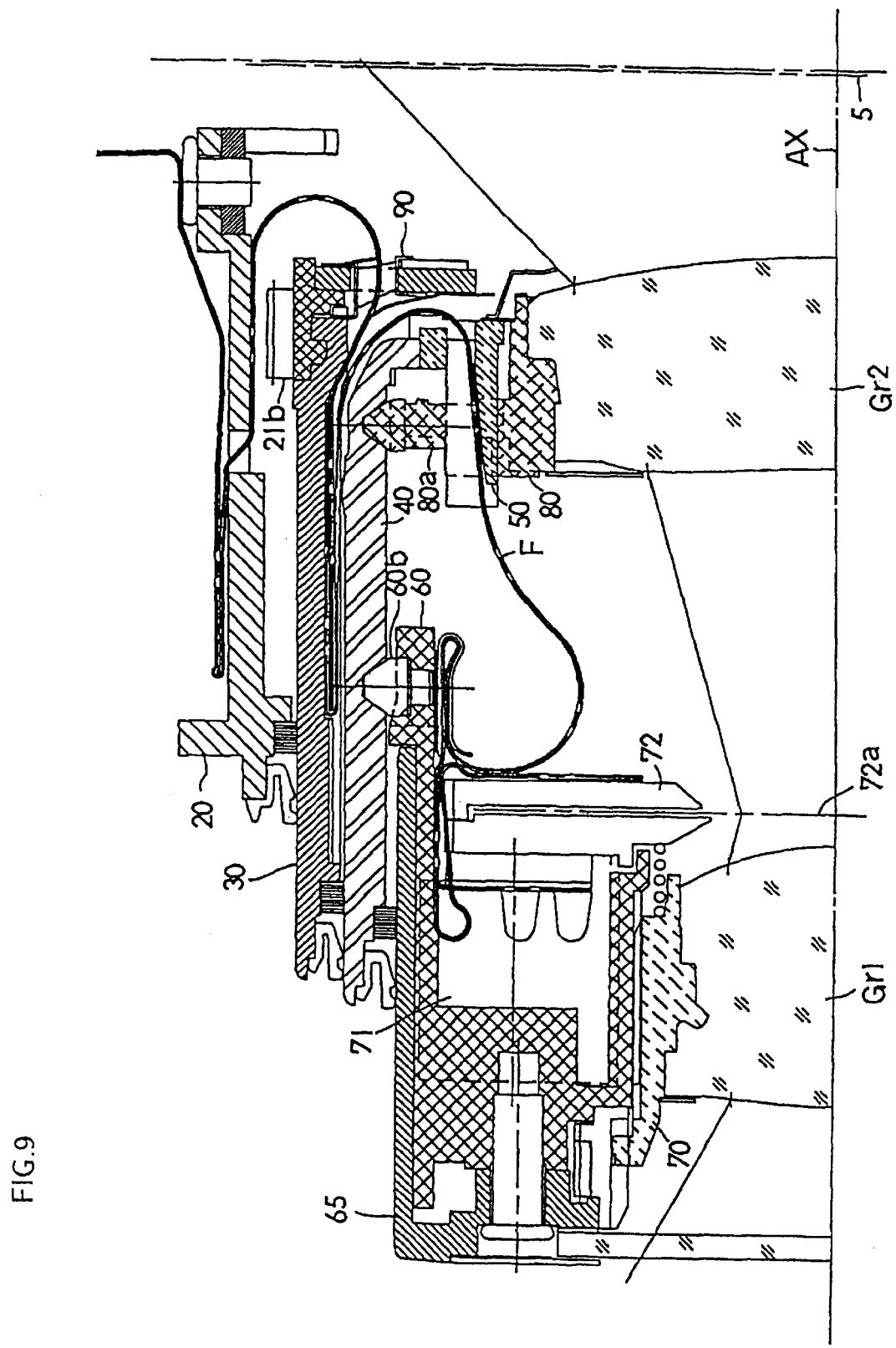
FIG. 9 is a detailed vertical cross-sectional view showing the manner in which the flexible substrate is housed in the condition shown in FIG. 2.
Figure 10:
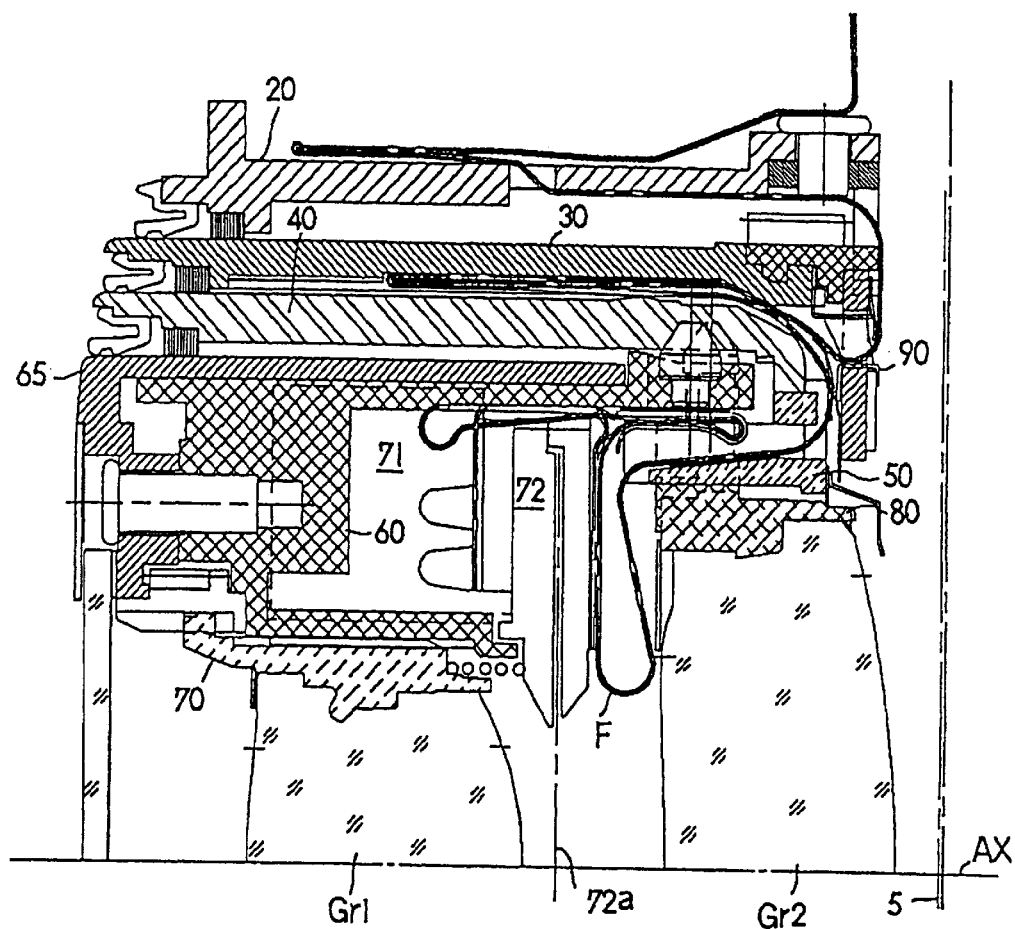
FIG. 10 is a detailed vertical cross-sectional view showing the manner in which the flexible substrate is housed in the condition shown in FIG. 3.

As shown in FIGS. 1 through 3, flexible substrate F that electrically connects focus unit 71 and shutter unit 72 to camera body B is used inside the lens barrel. FIGS. 6(A) through 7(B) show in a simplified fashion the manner in which flexible substrate F is arranged inside the lens barrel shown in FIGS. 1 through 3. FIG. 6(A) shows the manner in which flexible substrate F is arranged in the telephoto condition. FIG. 6(B) shows the manner in which it is arranged in the wide angle condition. FIG. 6(C) shows the manner in which it is arranged when the lens barrel is completely collapsed. FIG. 7(A) shows the manner in which flexible substrate F is arranged in the wide angle condition. FIG. 7(B) shows the manner in which it is arranged when the lens barrel is completely collapsed. FIGS. 8 through 10 show the arrangement of flexible substrate F with a larger perspective. Flexible substrate F is fixed to the inner surfaces of first through third straight advancing barrels 30, 50 and 60 such that it is not affected by the rotation of first and second rotating barrels 20 and 40, and is guided over the outer surface of second lens holder 80. The guiding of flexible substrate F near first rotating barrel 20 is explained below.

As the lens barrel is collapsed from the telephoto condition to the wide angle condition and then to the completely collapsed position, flexible substrate F becomes loose. Since the moving-out amount is particularly large in a collapsible multi-step moving-out lens barrel, flexible substrate F becomes extremely loose when the lens barrel is completely collapsed. Therefore, this lens barrel uses the space that is used as an optical path during photo-taking (that is, within the effective optical path of the photo-taking lens) in order to accommodate the extra length of flexible substrate F as the lens barrel is collapsed.

The mechanism to accommodate flexible substrate F will now be explained. During the movement of the lens barrel from the telephoto condition to the wide angle condition, second lens unit Gr2 moves at a larger moving speed than first lens unit Gr1, as shown in FIGS. 1, 2, 6(A), 6(B), 8 and 9. Consequently, the distance between first lens unit Gr1 and second lens unit Gr2 increases, and flexible substrate F becomes loose between these two lens units. The extra length of flexible substrate F here is situated outside the effective optical path of the photo-taking lens, however, and therefore it does not affect photo-taking.

In the shift of the lens barrel from the wide angle condition to the completely collapsed position, first lens unit Gr1 moves at a larger moving speed than second lens unit Gr2, as shown in FIGS. 2, 3, 5, 6(B), 6(C), 9 and 10. Consequently, the distance between first lens unit Gr1 and second lens unit Gr2 decreases. As the distance between these two lens units decreases, loose part of flexible substrate F is sandwiched between first lens unit Gr1 and second lens unit Gr2 and bends in the direction perpendicular to optical axis AX.

As shown in FIGS. 3 and 10, a part of the loose part of flexible substrate F enters the effective optical path of the photo-taking lens when the lens barrel is completely collapsed. However, since the lens barrel is not used when it is completely collapsed, it does not pose any problems for the extra length of flexible substrate F to be inside the effective optical path of the photo-taking lens. Therefore, even if the moving-out amount is large, flexible substrate F may be compactly accommodated when the lens barrel is completely collapsed. In addition, since it is not necessary to have a specified space for accommodating flexible substrate F, the freedom in the design of the lens barrel also increases.

As described above, because the space between first lens unit Gr1 and second lens unit Gr2, the length of which along optical axis AX changes as the lens barrel is moved out, is used to accommodate flexible substrate F, the space inside the lens barrel may be effectively utilized. This is because the space between zooming units Gr1 and Gr2 is relatively large even when the lens barrel is completely collapsed, and is located at a position to which it is easy to guide the extra length of flexible substrate F when the lens barrel is completely collapsed.

Further, because the space to accommodate flexible substrate F is located on the side of film surface 5 behind shutter screen 72a, when the user looks at the photo-taking lens from the front when the camera is not in use, flexible substrate F is hidden behind shutter screen 72a and is not visible. Therefore, it does not occur to the user to worry that the camera may be broken. Where no rear cover is used on camera body B, since the photo-taking lens (specifically, second lens unit Gr2) cannot be seen from the rear side, the user similarly does not worry.

Anti-Friction Protective Member 90 for Flexible Substrate F (FIGS. 11 Through 15)

The guiding of flexible substrate F near first rotating barrel 20 will now be explained. As described above, first straight advancing barrel 30, to the inner surface of which is fixed flexible substrate F, moves along optical axis AX together with rotating moving-out member 22 that moves along optical axis AX while rotating. On the other hand, first rotating barrel 20 is constructed such that it transmits, via drive force transmission member 21 located outside first straight advancing barrel 30 at its rear end, the rotational force to rotating moving-out member 22 located inside first straight advancing barrel 30. Therefore, flexible substrate F that is fixed to stationary barrel 10 and first straight advancing barrel 30 runs near first rotating barrel 20 between first straight advancing barrel 30 and stationary barrel 10.

Figure 11:
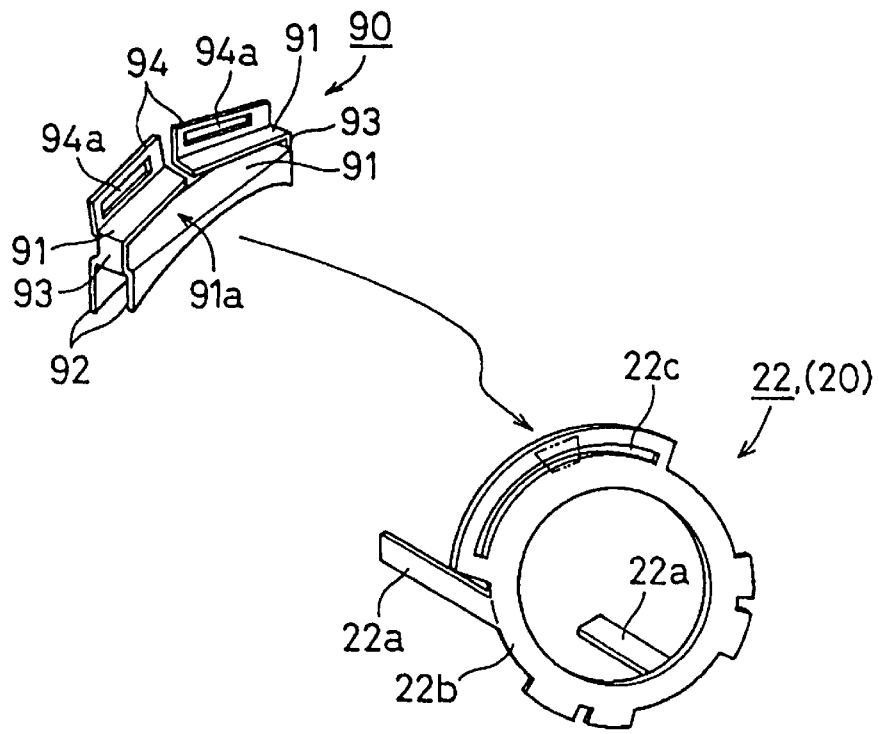
FIG. 11 is a perspective view showing the manner in which an anti-friction protective member is attached to the rotating moving-out member.
Figure 12:
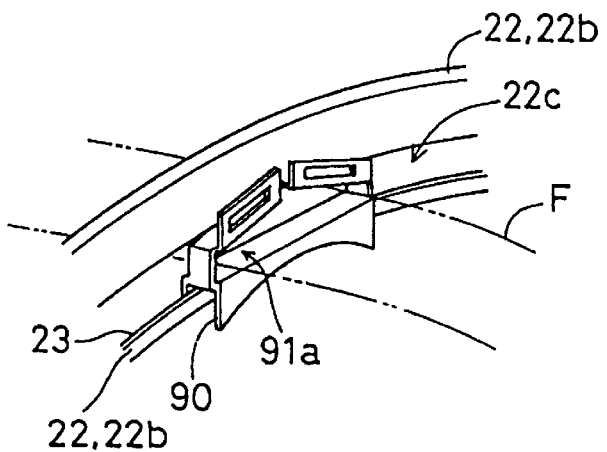
FIG. 12 is a perspective view showing the anti-friction protective member attached to the first rotating barrel.
Figure 13:
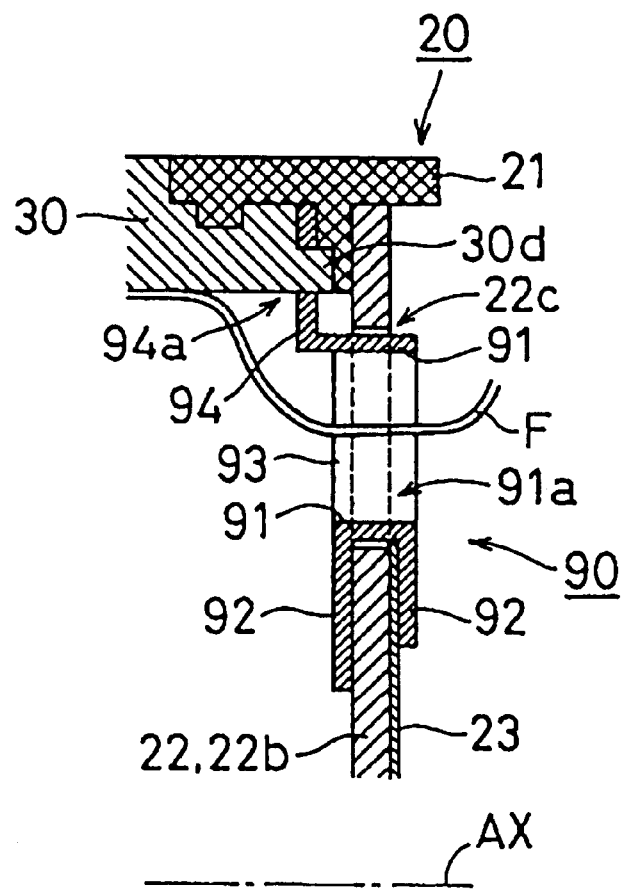
FIG. 13 is a vertical cross-sectional view showing the anti-friction protective member attached to the first rotating barrel.
Figure 14:
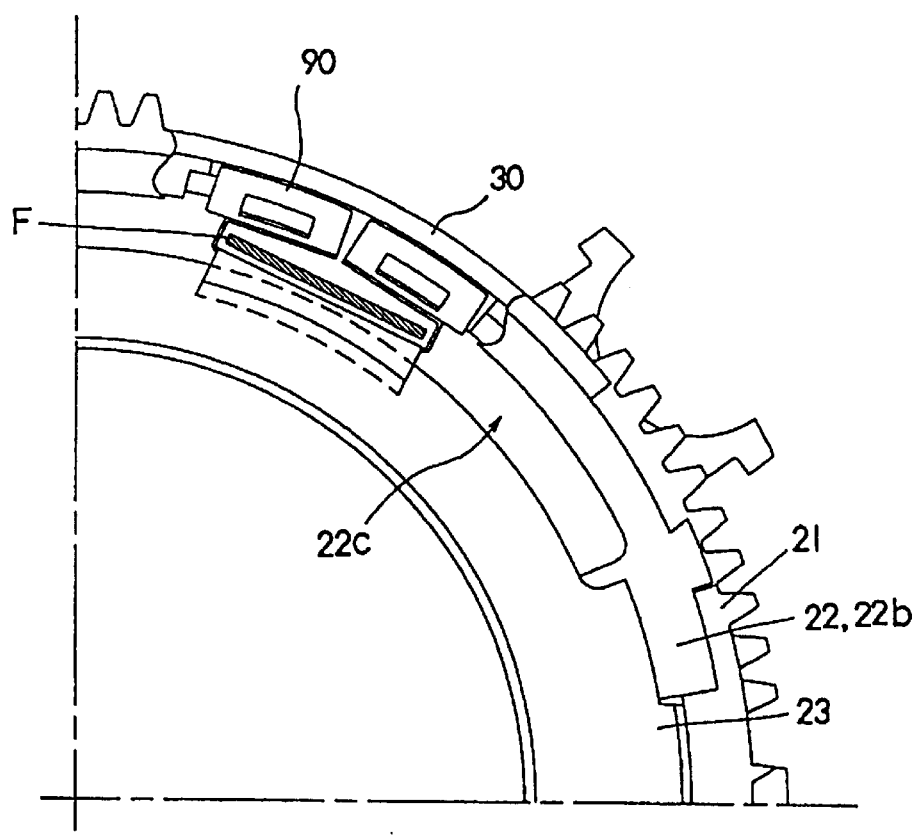
FIG. 14 is a partial exterior view of the important area showing how the anti-friction protective member is attached to the first rotating barrel, as seen from the rear side of the lens barrel.

Therefore, in this lens barrel a metal anti-friction protective member 90 is used to guide flexible substrate F such that flexible substrate F does not enter the effective optical path during photo-taking and to prevent flexible substrate F from being damaged and breaking due to friction from the rotation of first rotating barrel 20. Anti-friction protective member 90 comprises protectors 91, optical axis direction supporters 92 and first and second rotation direction supporters 93 and 94, as shown in FIG. 11. The external perspective view of FIG. 12 shows anti-friction protective member 90 attached to flange 22b of rotating moving-out member 22 and fixed member 23 that comprise a part of first rotating barrel 20. FIG. 13 shows a vertical cross-sectional view of its construction, and FIG. 14 shows it as seen from the rear side of the lens barrel.

Protectors 91 are used, via their location between first rotating barrel 20 and flexible substrate F, to protect flexible substrate F such that there is no friction between flexible substrate F and first rotating barrel 20. On the other hand, optical axis direction supporters 92 and first and second rotation direction supporters 93 and 94 are used to protect anti-friction protective member 90 such that anti-friction protective member 90 moves in the same manner as flexible substrate F.

Optical axis direction supporters 92 are held by first rotating barrel 20 such that anti-friction protective member 90 moves along optical axis AX together with first rotating barrel 20. This will be explained in further detail below. Arc-shaped long hole 22c is formed on flange 22b of rotating moving-out member 22 described above, as shown in FIG. 11. Anti-friction protective member 90 is mounted such that optical axis direction supporters 92 sandwich flange 22b and fixed member 23 inside long hole 22c (FIGS. 11 through 14), and such that the part comprising protector 91 and optical axis direction supporters 92 and whose cross-section has an inverted C configuration may engage with the edge of long hole 22c and slide in the direction of the rotation (FIG. 13). Flexible substrate F is guided by having it pass through pentagonal opening 91a formed by protectors 91 and rotation direction supporters 93 as shown in FIGS. 12 through 14.

When rotating moving-out member 22 moves along optical axis AX while rotating, with anti-friction protective member 90 mounted to it as described above, anti-friction protective member 90 moves along optical axis AX together with rotating moving-out member 22. This is because the position of anti-friction protective member 90 along optical axis AX is determined by optical axis direction supporters 92. Further, since protectors 91 are located between flexible substrate F and rotating moving-out member 22 and fixed member 23 when anti-friction protective member 90 is mounted as described above, friction between flexible substrate F and rotating moving-out member 22 or fixed member 23 during rotation is prevented by means of protectors 91.

First rotation direction supporters 93 are held in place by flexible substrate F such that anti-friction protective member 90 does not move in the direction of rotation of first rotating barrel 20. This will be explained in further detail below. When rotating moving-out member 92 rotates, anti-friction protective member 90 receives friction from flange 22b and fixed member 23 via protector 91 and optical axis direction supporters 92. When this happens, anti-friction protective member 90 receives a force in the direction of rotation, but flexible substrate F comes into contact with first rotation direction supporter 93 and holds anti-friction protective member 90 in place through its elasticity such that anti-friction protective member 90 does not rotate. In this way, anti-friction protective member 90 is kept stationary in terms of the direction of rotation by means of the elasticity of flexible substrate F. While anti-friction protective member 90 relatively moves inside long hole 22c together with flexible substrate F, this relative movement in the direction of rotation is guided by the edge of long hole 22c that is engaged with protector 91 and optical axis direction supporters 92, and as a result, anti-friction protective member 90 does not become disengaged from flange 22b.

Second rotation direction supporters 94, like first rotation direction supporters 93, are held in place by first straight advancing barrel 30, such that anti-friction protective member 90 does not move in the direction of rotation of first rotating barrel 20. This will be explained in further detail below. While the position of anti-friction protective member 90 may be controlled through the elasticity of flexible substrate F, as described above, anti-friction protective member 90 has second rotation direction supporters 94 with openings 94a for better control of the position of friction protective member 90. Openings 94a formed on second rotation direction supporters 94 may engage with protrusions 30d formed at the rear end of first straight advancing barrel 30. Therefore, when rotating moving-out member 22 rotates, if anti-friction protective member 90 receives a force in the direction of rotation due to its engagement with flange 22b via protector 91 and optical axis direction supporters 92, anti-friction protective member 90 is maintained in place and does not rotate by means of protrusions 30d engaged with openings 94.

As described above, since optical axis direction supporters 92 are held onto first rotating barrel 20 such that they move along optical axis AX together with first rotating barrel 20, when first rotating barrel 20 and first straight advancing barrel 30 move, the position of anti-friction protective member 90 relative to first straight advancing barrel 30 along optical axis AX does not change. In addition, since first and second rotation direction supporters 93 and 94 are held in place by flexible substrate F and first straight advancing barrel 30 so that anti-friction protective member 90 does not move in the direction of rotation of first rotating barrel 20, when first rotating barrel 20 rotates, the position of anti-friction protective member 90 relative to first straight advancing barrel 30 does not change in the direction of rotation. Therefore, flexible substrate F is protected from the friction with first rotating barrel 20 by protectors 91, in the vicinity of first rotating barrel 20, while maintaining its position relative to first straight advancing barrel 30 by means of supporters 92 through 94.

Because flexible substrate F is not affected by the rotation of first or second rotating barrels 20 or 40, as described above, using anti-friction protective member 90, flexible substrate F may be located in the vicinity of first rotating barrel 20 while avoiding friction with it. This greatly increases the freedom in the design of the lens barrel. Further, because this design only calls for protrusions 30d on first straight advancing barrel 30, the freedom in the lens barrel construction is increased in this regard as well. Anti-friction protective member 90 may be applied not only where rotating barrels are mounted inside straight advancing barrels, but as long as flexible substrate F fixed onto straight advancing barrels runs near rotating members.

Using anti-friction protective member 90 that is a separate member from first straight advancing barrel 30, as described above, the manufacturing of the lens barrel is easier than when the lens barrel is constructed using said members formed together as one unit, because if a part equivalent to anti-friction protective member 90 were attempted to be made as a part of first straight advancing barrel 30, the configuration of first straight advancing barrel 30 would be complex, which would increase the limitations encountered in the making of the mold.

Figure 15:
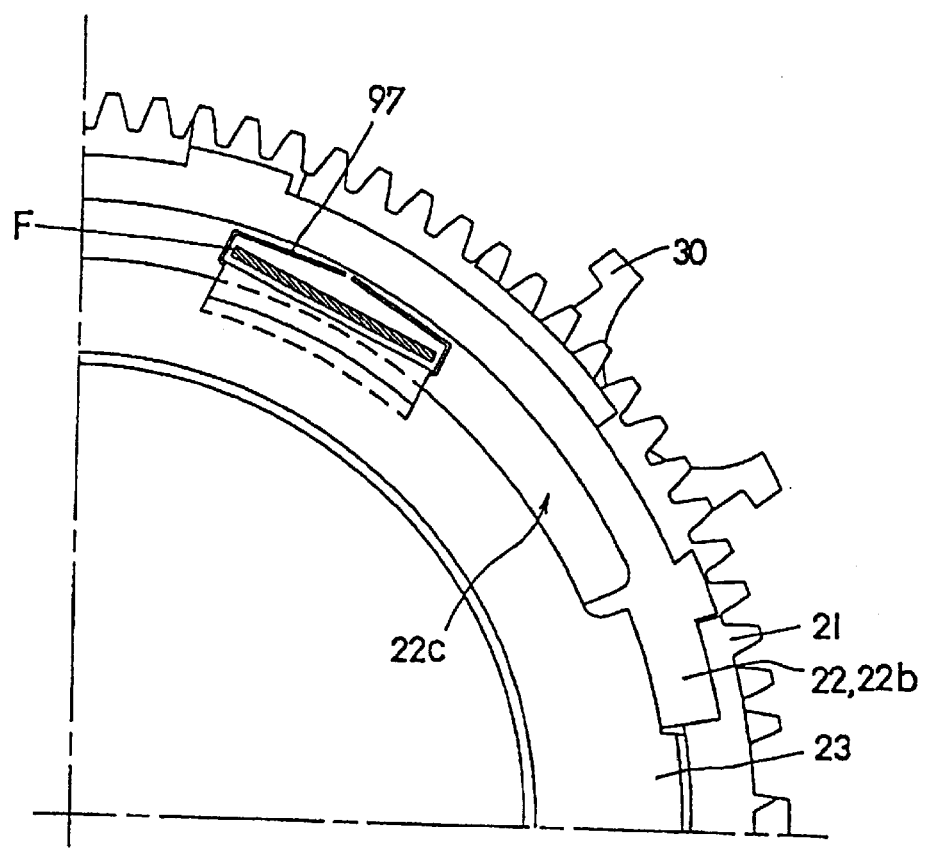
FIG. 15 is an exterior view showing how a different anti-friction protective member is attached to the first rotating barrel, as seen from the rear side of the lens barrel.

While anti-friction protective member 90 is held in place in the direction of rotation by means of flexible substrate F and first straight advancing barrel 30, a construction in which rotation direction supporters 94 are omitted and only the elasticity of flexible substrate F is employed may be used where necessary. FIG. 15 shows anti-friction protective member 97 that does not have rotation direction supporters 94. This anti-friction protective member 97 is constructed identically to anti-friction protective member 90 except for that it does not have rotation direction supporters 94. Anti-friction protective member 97 has the advantage of allowing increased freedom in design relative to anti-friction protective member 90 to the extent that it does not have rotation direction supporters 94.

Figure 16:
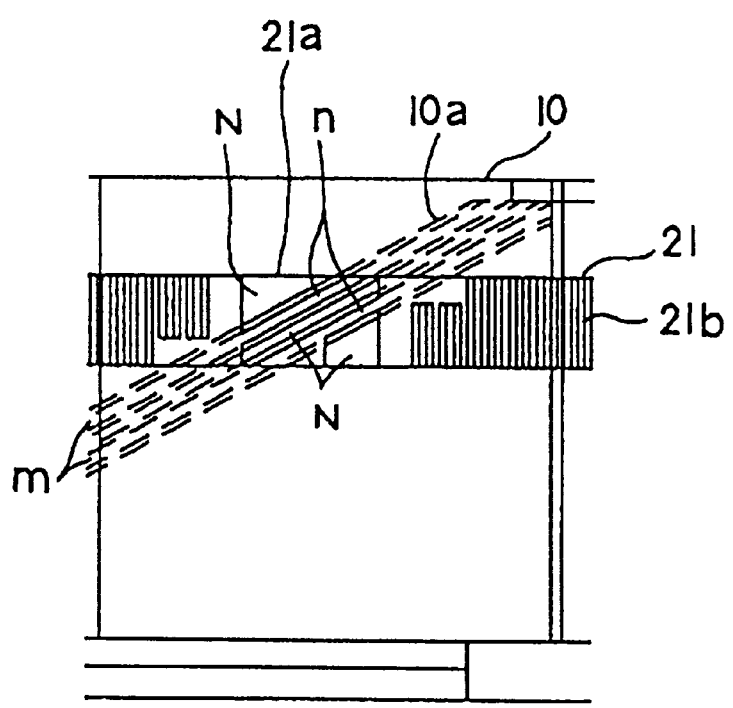
FIG. 16 is a development illustration showing a part of the helicoid mechanism used for the moving out of the first rotating barrel.
Figure 17A:
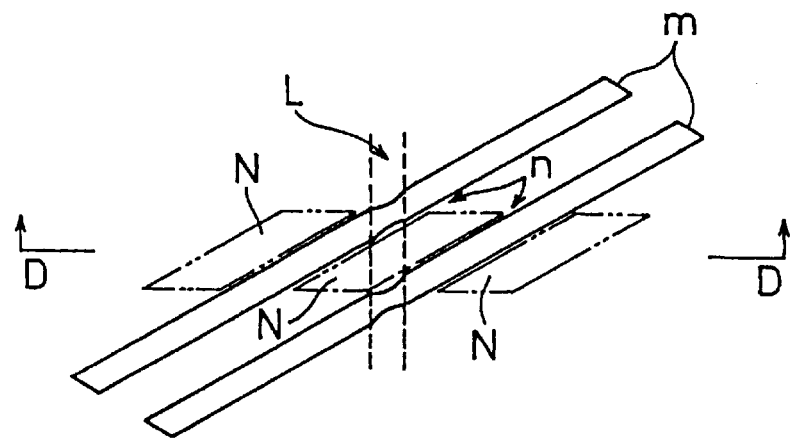
FIGS. 17(A) and 17(B) are a dynamic illustration showing a part of the helicoid mechanism and a simplified cross-sectional view of the same, respectively.
Figure 17B:
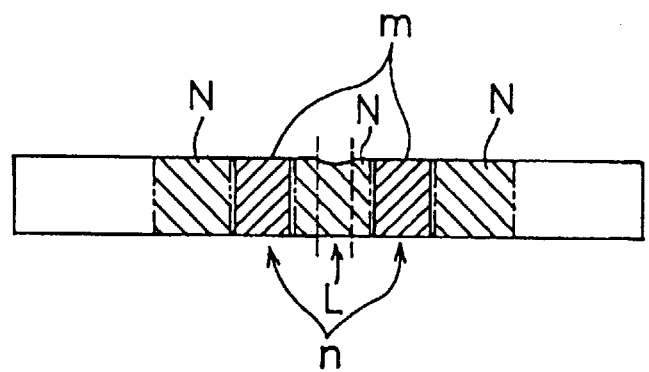
Figure 18A:
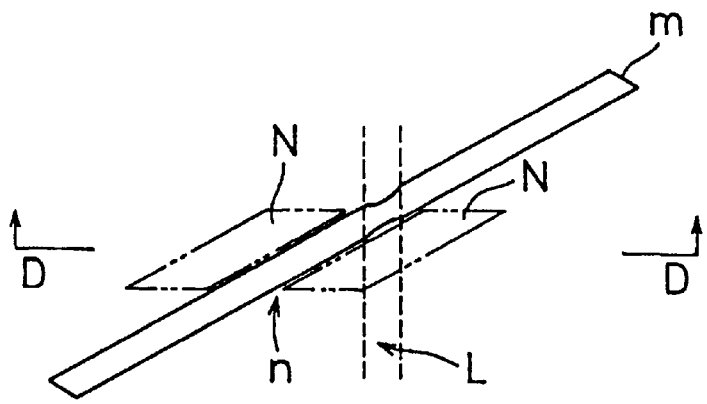
FIGS. 18(A) and 18(B) are a dynamic illustration showing a part of another helicoid mechanism and a simplified cross-sectional view of the same, respectively, for the purpose of comparison with the helicoid mechanism shown in FIG. 17.
Figure 18B:
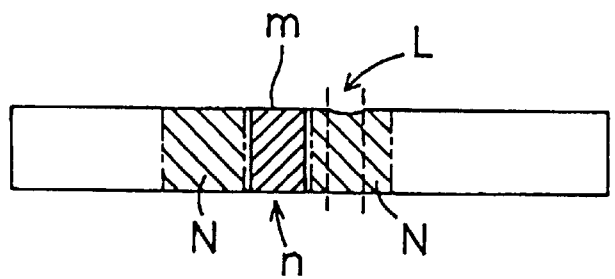
Figure 19:
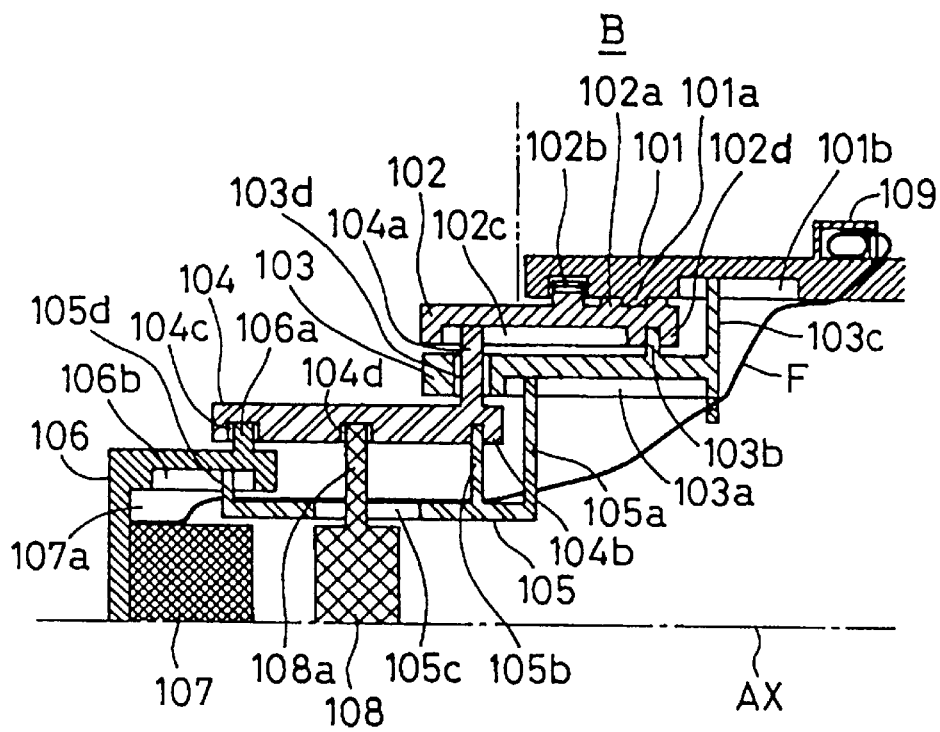
FIG. 19 is a simplified vertical cross-sectional view of a conventional lens barrel, showing its construction.

Helicoid Mechanism (FIGS. 16 Through 18)

The helicoid mechanism comprising male helicoids 21a formed on the outer surface of drive force transmission member 21 and female helicoids 10a formed on the inner surface of stationary barrel 10 will now be explained. FIG. 16 shows a development of a part of this helicoid mechanism. As shown in FIG. 16, two ridges m are formed in female helicoid 10a and two valleys n that engage with ridges m are formed in male helicoid 21a.

Three sets of male helicoids 21a and gear teeth 21b are formed alternately on the outer surface of drive force transmission member 21 along the direction of rotation. It is possible to form the male helicoids and gear teeth on the outer surface of drive force transmission member 21 in an overlapping fashion. However, drive force transmission member 21 would have to be made longer along optical axis AX in order to increase the strength of the gear. If drive force transmission member 21 is longer along optical axis AX, camera body B also increases in thickness. This is why male helicoids 21a and gear teeth 21b are alternately formed along the direction of rotation as described above. However, in order for male helicoids 21a and gear teeth 21b to alternately exist on the same surface, it is necessary to reduce the number of valleys n of male helicoid 21a to the extent possible.

The features of the helicoid mechanism used in the moving out of first rotating barrel 20 will be explained with reference to two examples in which the number of valleys n of the male helicoid is small. FIG. 17 shows a part of a helicoid mechanism comprising a female helicoid (solid line) having two ridges and a male helicoid (two-dot chain line) having two valleys n with which ridges m engage. This helicoid mechanism has the same construction as the helicoid mechanism shown in FIG. 16 except that the configuration of ridges N that create valleys n is different. FIG. 18 shows a part of a helicoid mechanism comprising a female helicoid (solid line) having one ridge m and male helicoid (two-dot chain line) having one valley n with which ridge m engages. In FIGS. 17 and 18, drawings (A) are plan views and drawings (B) are cross-sectional views of (A) cut along the D—D line.

In FIGS. 17 and 18, L are concave areas that are formed at the parting line of the female helicoid mold. Concave areas L are formed in order to prevent first rotating barrel 20 from becoming stuck as it is moved out, on account of the parting line of the mold. In the helicoid mechanism shown in FIG. 18, ridges N that create valley n of the male helicoid are in contact with ridge m of the female helicoid using one side only. Moreover, equal pressure is not necessarily applied by ridges N onto ridge m via their contact surfaces. Consequently, when one ridge N passes concave area L, the alignment of the male helicoid becomes skew relative to the female helicoid due to the steps that exist between concave area L and the parts of ridge m before and after concave area L, and rattling of the male helicoid results. Because of this rattling, it cannot be guaranteed that the male helicoid is guided straight. In contrast, in the helicoid mechanism shown in FIG. 17, among the three ridges N that create valleys n of the male helicoid, center ridge N is sandwiched by the two ridges m of the female helicoid. Consequently, when any of the ridges N passes concave area L, the other ridges N are in contact with the flat parts of ridges m where concave area L does not exist, and therefore the male helicoid does not rattle. Therefore, it is guaranteed that the male helicoid is guided straight. Moreover, since the number of ridges m and valleys n is no more than the essential minimum, the freedom in designing the helicoid mechanism increases.

If two ridges are formed on either of the male or female helicoid and two valleys with which the ridges engage are formed on the other helicoid, the effect described above may be obtained. Therefore, the present invention is not limited to the helicoid mechanisms shown in FIGS. 16 and 17. Two valleys may be formed on the female helicoid and two ridges that engage with the valleys may be formed on the male helicoid. However, in order to effectively use the space between stationary barrel 10 and drive force transmission member 21, the helicoid mechanisms shown in FIGS. 16 and 17 are preferred. If at least three sets of either of these helicoid mechanisms are used, first rotating barrel 20 may be supported and the moving out of the lens barrel may be performed.

In the helicoid mechanism shown in FIG. 16, the two end ridges N, among the three ridges N, have larger configurations that are different from that of center ridge N (triangle, trapezoid). This prevents ridge m of the female helicoid from entering valley n that is not the valley in which it should enter, thereby causing an incorrect engagement.

Obviously, many modifications and variation of the present invention are possible in light of the above teachings. It is therefore to be understood that within the scope of the appended claims, the invention may be practiced other than as specifically described.

What is claimed is:

1. A collapsible lens barrel of an optical apparatus, comprising:
    a moving member which is movable in a direction of an optical axis of a lens;
    an electric element which is fixed on the moving member;
    at least one lens group; and
    a flexible substrate which electrically connects the electric element and another electric element in a body of the optical apparatus,
    the flexible substrate being arranged such that the flexible substrate enters an optical path of the at least one lens group when the lens barrel is completely collapsed and such that the flexible substrate is located out of the optical path when the lens barrel is fully extended.

2. A lens barrel as claimed in claim 1, wherein the flexible substrate is arranged such that the flexible substrate is folded between two members in the lens barrel and enters inside of the optical path when the lens barrel is completely collapsed.

3. A lens barrel as claimed in claim 1, wherein the flexible substrate is arranged such that the flexible substrate is folded between the at least one lens group and a member in the lens barrel and enters inside of the optical path when the lens barrel is completely collapsed.

4. A lens barrel as claimed in claim 3, wherein the member includes a shutter mechanism.

5. A lens barrel as claimed in claim 3, further comprising a shutter mechanism which is disposed on an object side of the folded flexible substrate.

6. A lens barrel as claimed in claim 1, wherein the optical apparatus is configured such that the moving member is directly adjacent to the body of the optical apparatus when the lens barrel is completely collapsed.

7. A collapsible lens barrel of a camera, comprising:
    a moving member which is movable in a direction of an optical axis of a lens;
    an electric element which is fixed on the moving member;
    a flexible substrate which electrically connects the electric element and another electric element in a body of the camera; and
    a lens frame which holds a lens and is movable in a direction of an optical axis of a lens, said lens frame being located adjacent to said moving member when the lens barrel is completely collapsed,
    wherein the flexible substrate is arranged such that the flexible substrate folds between the moving member or the electric element and the lens frame when the moving member and the lens frame are located adjacent each other.

8. A lens barrel as claimed in claim 7, wherein camera is configured such that the moving member and the lens frame are adjacent each other when the lens barrel is completely collapsed.

9. A lens barrel as claimed in claim 8, wherein the flexible substrate enters inside of an imaginary cylinder extending parallel with the optical axis of the lens and having a diameter equal to a diameter of the lens when the lens barrel is completely collapsed.

10. A collapsible lens barrel of a camera, comprising:
   a moving member which is movable in a direction of an optical axis of a lens;
   an electric element which is fixed on the moving member;
   at least one lens group; and
   a flexible substrate which electrically connects the electric element and another electric element in a body of the optical apparatus, the flexible substrate being arranged such that the flexible substrate enters an optical path of the at least one lens group when the lens barrel is completely collapsed and such that the flexible substrate is located out of the optical path when the lens barrel is fully extended.

11. A camera comprising:
   a collapsible lens barrel having:
      a moving member which is movable in a direction of an optical axis of a lens;
      an electric element which is fixed on the moving member;
      at least one lens group; and
      a flexible substrate which electrically connects the electric element and another electric element in a body of the optical apparatus, the flexible substrate being arranged such that the flexible substrate enters an optical path of the at least one lens group when the lens barrel is completely collapsed and such that the flexible substrate is located out of the optical path when the lens barrel is fully extended.

* * * * *